United States Patent
Hada et al.

(10) Patent No.: US 9,771,979 B2
(45) Date of Patent: Sep. 26, 2017

(54) MANUFACTURING METHOD FOR TAPERED ROLLER, AND TAPERED ROLLER BEARING

(71) Applicant: NSK Ltd., Tokyo (JP)

(72) Inventors: Ryosuke Hada, Kanagawa (JP); Sotaro Yamashita, Kanagawa (JP)

(73) Assignee: NSK Ltd. (JP)

( * ) Notice: Subject to any disclaimer, the term of this patent is extended or adjusted under 35 U.S.C. 154(b) by 2 days.

(21) Appl. No.: 15/025,635

(22) PCT Filed: Sep. 30, 2014

(86) PCT No.: PCT/JP2014/076216
§ 371 (c)(1),
(2) Date: Mar. 29, 2016

(87) PCT Pub. No.: WO2015/050144
PCT Pub. Date: Apr. 9, 2015

(65) Prior Publication Data
US 2016/0215821 A1    Jul. 28, 2016

(30) Foreign Application Priority Data
Oct. 2, 2013   (JP) .................................. 2013-207194

(51) Int. Cl.
*F16C 33/64* (2006.01)
*F16C 33/36* (2006.01)
(Continued)

(52) U.S. Cl.
CPC .............. *F16C 33/366* (2013.01); *B24B 5/37* (2013.01); *F16C 19/364* (2013.01); *F16C 33/585* (2013.01); *F16C 2220/70* (2013.01)

(58) Field of Classification Search
CPC .... F16C 33/366; F16C 33/585; F16C 19/585; B24B 5/37
See application file for complete search history.

(56) References Cited

U.S. PATENT DOCUMENTS 3,334,445 A * 8/1967 Green ....................... B24B 5/14
451/243
6,789,949 B2 * 9/2004 Suzuki .................. F16C 19/364
384/462
(Continued)

FOREIGN PATENT DOCUMENTS

JP    H09-076029    3/1997
JP    2000-304054   10/2000
(Continued)

OTHER PUBLICATIONS

PCT App. No. PCT/JP2014/076216; International Search Report dated Jan. 13, 2015.

*Primary Examiner* — Thomas R. Hannon
(74) *Attorney, Agent, or Firm* — Hartman Global IP Law; Gary M. Hartman; Domenica N. S. Hartman

(57) ABSTRACT

The present invention provides a manufacturing method by which a good quality tapered roller can be obtained at low cost. An intermediate raw material (17) is obtained by grinding an outer-circumferential surface (15) of a preliminary intermediate raw material (14), which is obtained by plastic working of a metallic circular column shaped raw material, using a grindstone (16), with a large diameter-side end surface (10) of the intermediate raw material (14) as a reference. A final intermediate raw material (21*a*) is obtained by grinding the large diameter-side end surface (10) of the intermediate raw material (17) using a grindstone (20), and grinding the intermediate raw material (17) by a predetermined length instead of setting the intermediate raw material (17) to a predetermined length.

4 Claims, 5 Drawing Sheets

(51) Int. Cl.
F16C 19/36 (2006.01)
B24B 5/37 (2006.01)
F16C 33/58 (2006.01)

(56) References Cited

U.S. PATENT DOCUMENTS 9,174,316 B2 * 11/2015 Higashi .................. B23P 13/02
2003/0236058 A1 * 12/2003 Kamamura ............... B24B 5/01
451/49

FOREIGN PATENT DOCUMENTS

| | | |
|---|---|---|
| JP | 2008-114238 | 5/2008 |
| JP | 2011-017651 | 1/2011 |
| JP | 2011-152597 | 8/2011 |

* cited by examiner

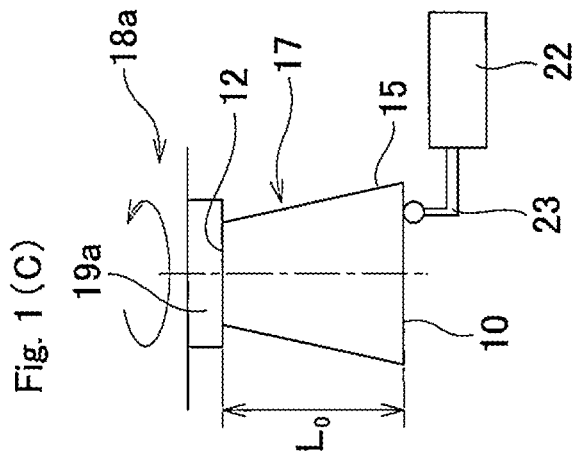
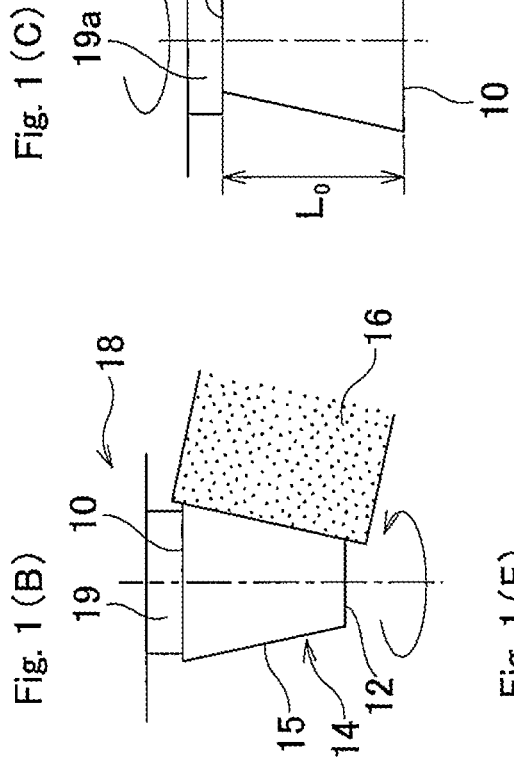
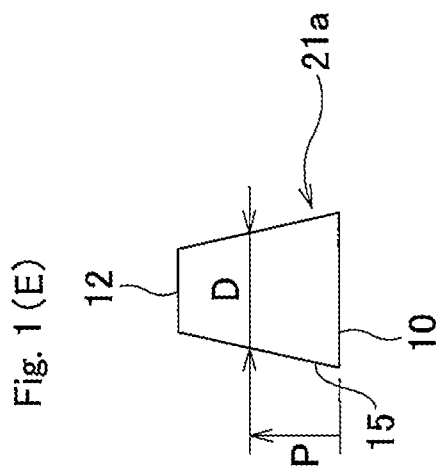
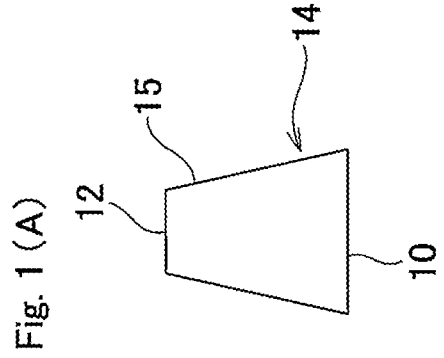
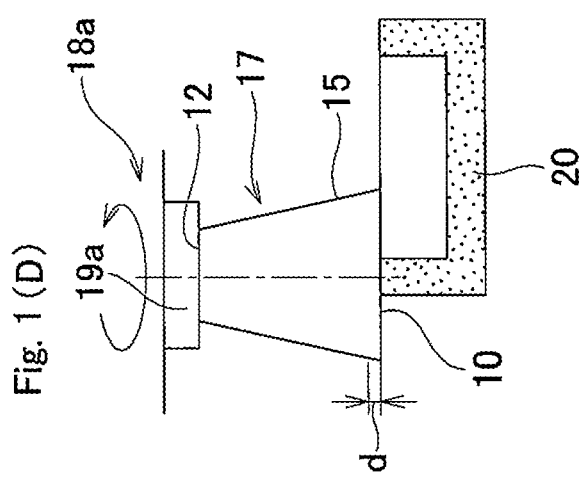

MANUFACTURING METHOD FOR TAPERED ROLLER, AND TAPERED ROLLER BEARING

TECHNICAL FIELD

The present invention relates to a tapered roller bearing that is assembled in a rotation support section of various kinds of rotary machinery, and relates to a method for manufacturing the tapered rollers of this tapered roller bearing.

BACKGROUND ART

FIG. 4 illustrates a tapered roller bearing 1 that is assembled in rotation support sections of rotary machinery such as machine tools, industrial machinery and the like to which large radial loads and thrust loads are applied. A tapered roller bearing 1 includes an outer ring 2, an inner ring 3 that is arranged concentrically with the outer ring 2, plural tapered rollers 4, and a retainer 5. The outer ring 2 has an outer-ring raceway 6 having a partial cone shaped surface around the inner-circumferential surface. The inner ring 3 is arranged on the inner-diameter side of the outer ring 2, and has an inner-ring raceway 7 having a partial cone shaped surface around the outer-circumferential surface. A large-diameter-side rim section 8 is formed around the end section on the large-diameter side (right-end section in FIG. 4) of the outer-circumferential surface of the inner ring 3 so as to protrude outward in the radial direction from the inner-ring raceway 7, and a small-diameter-side rim section 9 is formed around the end section on the small-diameter side (left-end section in FIG. 4) of the outer-circumferential surface of the inner ring 3 so as to protrude outward in the radial direction from the inner-ring raceway 7. The tapered rollers 4 are rotatably arranged between the outer-ring raceway 6 and inner-ring raceway 7. The tapered rollers 4 are shaped such that the diameter (outer diameter) of the outer-circumferential surface, which is the rolling contact surface, gradually becomes larger going in the direction from the end section on the small-diameter side (left-end section in FIG. 4) toward the end section on the large-diameter side (right-end section in FIG. 4). The end surface 10 on the large-diameter side of a tapered roller 4 (right-end surface in FIG. 4) comes in sliding contact with the inside surface 11 of the large-diameter-side rim section 8, and the end surface 12 on the small-diameter side (left-end surface in FIG. 4) faces the inside surface 13 of the small-diameter-side rim section 9 by way of a gap. The tapered rollers 4 are rotatably held by the retainer 5.

FIGS. 5A to 5D illustrate an example of a method for manufacturing a tapered roller. First, using the method such as disclosed in JP H09-076029 (A), JP 2008-114238 (A), a truncated cone shaped preliminary intermediate raw material 14 as illustrated in FIG. 5A is obtained by performing plastic working such as a forging process of a circular column shaped material that is made of a metal such as bearing steel. Next, as illustrated in FIG. 5B, with the large-diameter-side end surface 10 of the preliminary intermediate raw material 14 as a reference, grinding (rough grinding) using a grindstone 16 having large abrasive grain is performed on the outer-circumferential surface 15 of the preliminary intermediate raw material 14 that will become the rolling contact surface that comes in rolling contact with the outer-ring raceway 6 and inner-ring raceway 7 in the completed state. More specifically, with the center axes of the preliminary intermediate raw material 14 and the rotating shaft 19 of a spindle device 18 aligned, the large-diameter-side end surface 10 of the preliminary intermediate raw material 14 is butted against the tip-end surface of the rotating shaft 19 (bottom-end surface in FIG. 5B). In this state, as the preliminary intermediate raw material 14 is rotated by rotating the rotating shaft 19, the grindstone 16 is brought into contact with the outer-circumferential surface 15 of the preliminary intermediate raw material 14, and an intermediate raw material 17 is obtained by performing a grinding process on the outer circumferential surface 15.

Next, as illustrated in FIG. 5C, a grinding process is performed on the large-diameter-side end surface 10 of the intermediate raw material 17 to make the length (dimension in the axial direction) L of the intermediate raw material 17 a pre-determined specified value Lc. More specifically, the center axes of the intermediate raw material 17 and the rotating shaft 19a of the spindle device 18a are aligned, then the small-diameter-side end surface 12 of the intermediate raw material 17 is butted against the tip-end surface of the rotating shaft 19a, and the intermediate raw material 17 is rotated by rotating the rotating shaft 19a. In this state, while measuring the length L of the intermediate raw material 17 in an in-process, a cup-type grindstone 20 is brought into contact with the large-diameter-side end surface 10 of the intermediate raw material 17, and a grinding process is performed on the large-diameter-side end surface 10 by causing the grindstone 20 to displace a specified amount in the axial direction of the intermediate raw material 17. By completing the grinding process at the instant that the length L of the intermediate raw material 17 has reached a specified value Lc, a final intermediate raw material 21 as illustrated in FIG. 5D is obtained. The grindstone is not limited to being a cup-type grindstone as illustrated in the figure, and it is possible to use grindstones having various kinds of construction, such as a flat-shaped grindstone. The large-diameter-side end surface 10 of the intermediate raw material 17 can also be a partial spherical surface such as illustrated in FIG. 6. In that case, the length L of the intermediate raw material 17 is the length between the apex of the large-diameter-side end surface 10 and the small-diameter-side end surface 12. In any case, after the final intermediate raw material 21 has been obtained, a grinding process (finish grinding using superfinishing) is performed on the outer-circumferential surface 15 of the final intermediate raw material 21 using a grindstone that has small abrasive grain to obtain a tapered roller 4. In order to reduce the sliding resistance between the large-diameter-side end surface 10 of the tapered roller 4 and the inside surface 11 of the large-diameter-side rim section 8 of the inner ring 3, a grinding process using a grindstone is further performed on the large-diameter-side end surface 10 of the tapered roller 4 using a method such as disclosed in JP 2011-152597 (A).

In the case of this kind of method for manufacturing a tapered roller, there is a possibility of variation in the shape of the outer-circumferential surface 15 of the final intermediate raw material 21 that is defined by the outer diameter D of the outer-circumferential surface 15 when the position P in the axial direction based on the outer-diameter-side end surface 10 is the same. In other words, a preliminary intermediate raw material 14 that has a truncated cone shape is obtained by performed plastic working on a circular column-shaped metal raw material, so a certain amount of variation in the length (dimension in the axial direction) Lo (see FIG. 5A) of the preliminary intermediate raw material 14 will occur due to unavoidable manufacturing error and cannot be avoided. In the step of obtaining an intermediate raw material 17 by performing a grinding process on the outer-circumferential surface 15 of the preliminary intermediate raw material 14 with the large-diameter-side end surface 10 as a reference, there is very little variation in the shape of the outer-circumferential surface 15 of the intermediate raw material 17. However, the grinding process when performing a grinding process on the large-diameter-side end surface 10 in order to regulate the length (dimension in the axial direction) L of the intermediate raw material 17 to the specified length Lc is performed with the small-diameter-side end surface 12 of the intermediate raw material 17 as a reference, and the amount of grinding during the grinding process (feed amount of the grindstone 20) may vary due to variation in the length Lo of the preliminary intermediate raw material 14, that will cause variation to occur in the shape of the outer-circumferential surface 15 (outer diameter D of the outer-circumferential surface 15) of the final intermediate raw material 21. For example, when the cone angle of the tapered roller 4 (two times the angle value of the outer-circumferential surface 15 (angle between the center axis of the tapered roller 4 and the generating line)) is taken to be 4 degrees, and the variation in the length in the axial direction of the preliminary intermediate raw material 14 is taken to be 500 μm, the variation in the outer diameter D of the outer-circumferential surface 15 of the final intermediate raw material 21 becomes about 35 μm, which is too large to be ignored. Therefore, when plural tapered rollers 4 that were obtained by performing a finishing process on final intermediate raw materials 21 that were made by the method for manufacturing tapered rollers illustrated in FIG. 5A to FIG. 5D are assembled in a tapered-roller bearing 1, there is a possibility that variation will occur in the contact bearing pressure at the areas of rolling contact between the rolling contact surfaces of the tapered rollers 4 and the outer-ring raceway 6 and the inner-ring raceway 7, and there is a possibility that vibration and noise that occur during operation of the tapered-roller bearing 1 will become large. When trying to regulate the variation in the outer diameter D of the outer-circumferential surface 15 of the final intermediate raw material 21, there is a possibility that the amount of processing during finish grinding will increase, or that the processing time will vary, causing an increase in the manufacturing cost of the tapered rollers 4.

In the process illustrated in FIG. 5C, a method of grinding the large-diameter-side end surface 10 of the intermediate raw material 17 with the grindstone 20 for pre-determined amount of time is also possible. However, in that case, there is a possibility that variation in the amount of grinding (feed amount of the grindstone 20) will occur due to the state of the large-diameter-side end surface 10, and that variation in the outer diameter D of the outer-circumferential surface 15 of the final intermediate raw material 21 and also in the outer diameter of the rolling contact surface of the tapered rollers 4 will be too large to be ignored.

RELATED LITERATURE

Patent Literature

[Patent Literature 1] JP 2011-152597 (A)
[Patent Literature 2] JP H09-076029 (A)
[Patent Literature 3] JP 2008-114238 (A)

SUMMARY OF INVENTION

Problem to be Solved by Invention

Taking the situation described above into consideration, the object of the present invention is to provide good quality tapered rollers, and a tapered-roller bearing that uses those tapered rollers at low cost.

Means for Solving Problems

The present invention relates to a method for manufacturing tapered rollers having an outer diameter gradually becoming larger going in the direction from the small-diameter-side end section to the large-diameter-side end section. The method for manufacturing tapered rollers of the present invention, includes: a step of obtaining an intermediate raw material by performing a grinding process on the outer-circumferential surface of a truncated cone shaped raw material having an outer diameter gradually becoming larger going in the direction from the small-diameter-side end section to the large-diameter-side end section, and with the large-diameter-side end surface of the truncated cone shaped raw material being a reference; and a step of grinding the large-diameter-side end section of the intermediate raw material just a specified length in the axial direction. More specifically, when performing the grinding process on the outer-circumferential surface of the truncated cone shaped raw material, the large-diameter-side end surface is butted against the tip-end surface of a rotating shaft, and the truncated cone shaped raw material is rotated by rotating the rotating shaft, and in this state, a grindstone is brought into contact with the outer-circumferential surface of the truncated cone shape raw material.

Preferably, there is a step of measuring the length of the intermediate raw material before grinding the large-diameter-side end section of the intermediate raw material, with the small-diameter-side end surface of the intermediate raw material as a reference; and grinding of the large-diameter-side end section of the intermediate raw material is complete at the instant when, during grinding of the large-diameter-side end section of the intermediate raw material, the length of the intermediate raw material is equal to the difference between the measured value and the specified length. In this case, the small-diameter-side end surface of the intermediate raw material is butted against the tip-end surface of a rotating shaft, a measurement element of a measurement device is brought into contact with or made to closely face the large-diameter-side end surface of the intermediate raw material, and the intermediate raw material is rotated by rotating the rotating shaft; and in this state, the length of the intermediate raw material is measured by the measurement element of the measurement device.

The tapered-roller bearing includes: an outer ring having a partially conical-shaped outer-ring raceway formed around the inner-circumferential surface thereof an inner ring having a partially conical-shaped inner-ring raceway formed around the middle section of the outer-circumferential surface thereof, a large-diameter-side rim section formed on the larger-diameter-side end section thereof, and a small-diameter-side rim section formed on the small-diameter-side end section thereof; and plural tapered rollers that are rotatably provided between the outer-ring raceway and the inner-ring raceway. The tapered rollers that are obtained by the method for manufacturing tapered rollers of the present invention are used as the tapered rollers.

Effect of Invention

With the method for manufacturing tapered rollers of the present invention, it is possible to provide good quality tapered rollers at low cost. In other words, the method includes: a step of obtaining an intermediate raw material by performing a grinding process on the outer-circumferential surface of a truncated cone shape raw material, with the large-diameter-side end surface of the raw material being a reference; and a step of grinding the large-diameter-side end section of the intermediate raw material just a predetermined specified length. By grinding the intermediate raw material 17 just a predetermined specified length in this way instead of making the intermediate raw material a predetermined length, it is possible to keep variation in the outer diameter of the outer-circumferential surface of a final intermediate raw material that is obtained by grinding the large-diameter-side end section of the intermediate raw material small when the position in the axial direction based on the large-diameter-side end surface is the same, regardless of variation in the length of the truncated cone shaped raw material. As a result, when making the outer-circumferential surface of the final intermediate raw material a rolling contact surface by performing a finishing process on the outer-circumferential surface using superfinishing, there is no need to regulate the variation in the outer diameter of this outer-circumferential surface, and it is possible to obtain a good quality rolling contact surface while keeping the manufacturing cost of the tapered rollers low.

BRIEF DESCRIPTION OF DRAWINGS

FIG. 1A to FIG. 1E are partial cut-away side views illustrating the order of steps of an example of an embodiment of the present invention;

MODES FOR CARRYING OUT INVENTION

Figure 4:
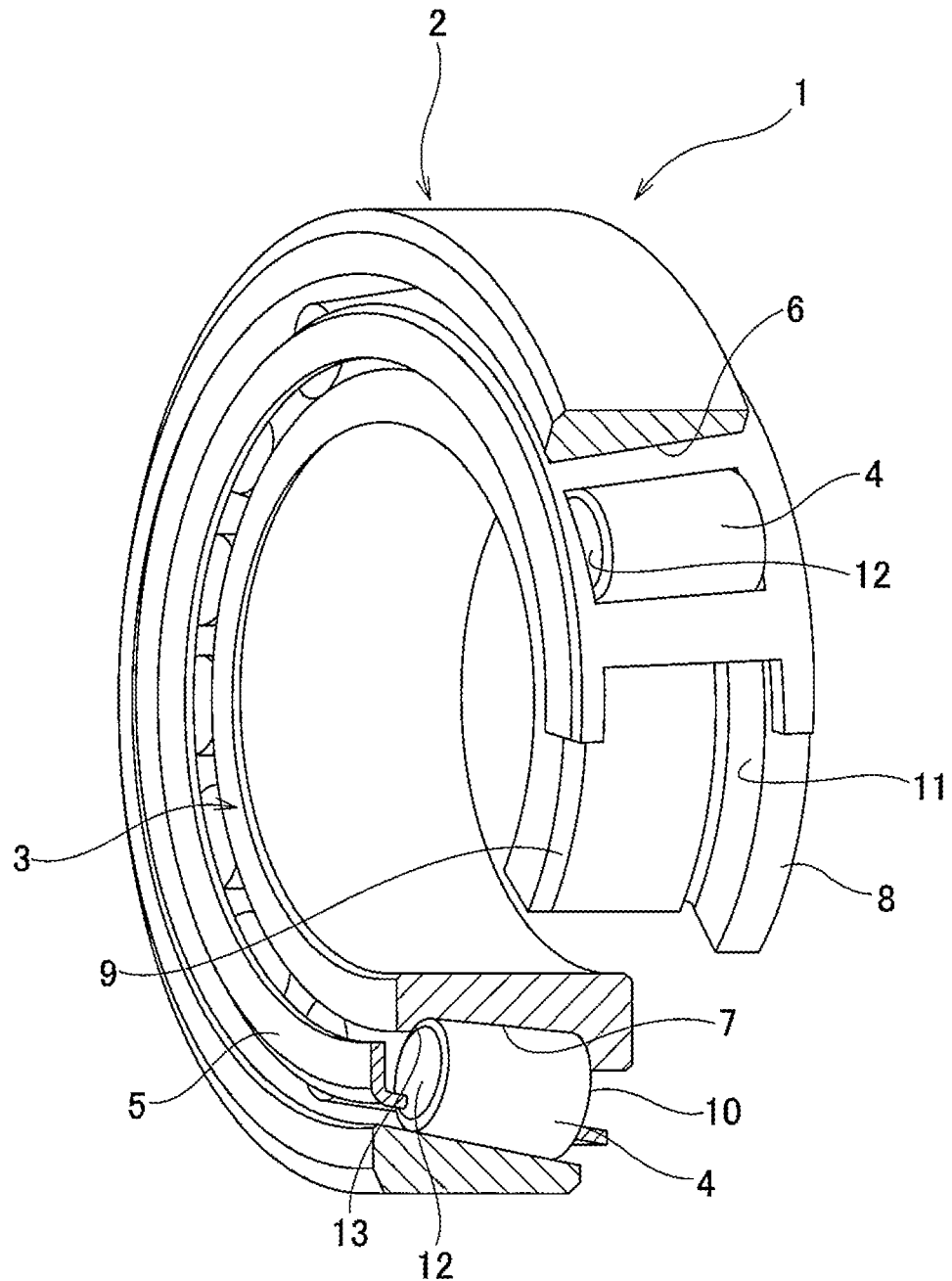
FIG. 4 is a partial cut-away perspective view illustrating an example of a tapered-roller bearing in which tapered rollers that are the object of the manufacturing method of the present invention are assembled.
Figure 5:
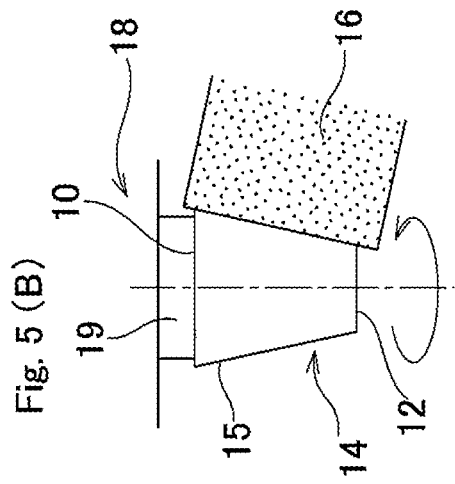
FIG. 5A to FIG. 5D are partial cut-away side views illustrating the order of steps in an example of a conventional method for manufacturing tapered rollers.
Figure 5:
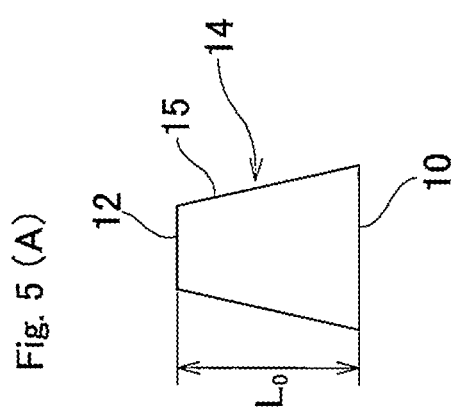
Figure 5:
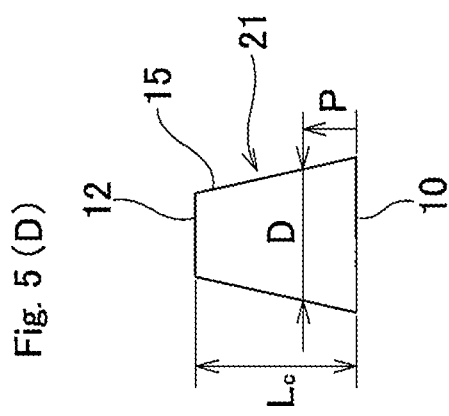
Figure 5:
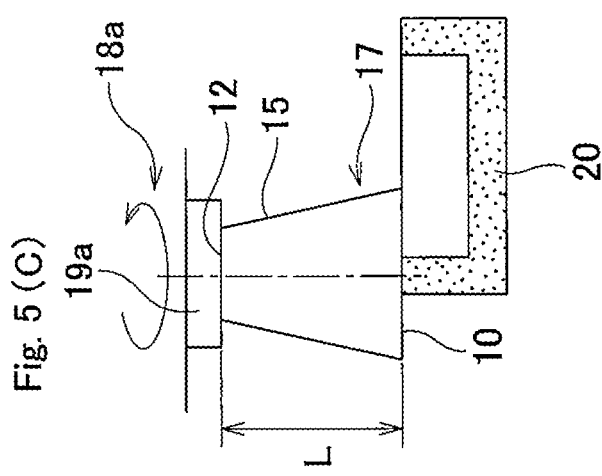
Figure 6:
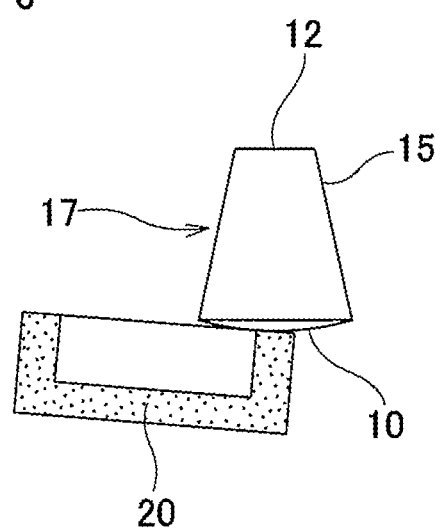
FIG. 6 is a partial cut-away side view illustrating another example of a method for performing a grinding process on the large-diameter-side end surface of an intermediate raw material.

FIG. 1A to FIG. 1E illustrate an example of an embodiment of the present invention. In this example, first plastic working, such as forging, is performed on a circular column-shaped raw material made of metal such as bearing steel to obtain an preliminary intermediate raw material 14 having a truncated cone shape as illustrated in FIG. 1A. Next, as illustrated in FIG. 1B, a grinding process (rough grinding) is performed on the outer-circumferential surface 15 of the preliminary intermediate raw material 14 using a grindstone 16 having large abrasive grain and with the large-diameter-side end surface 10 of the preliminary intermediate raw material 14 as a reference to obtain an intermediate raw material 17. In other words, with the center axes of the preliminary intermediate raw material 14 and rotating shaft 19 of a spindle device 18 aligned with each other, the large-diameter-side end surface 10 is butted against the tip-end surface (bottom-end surface in FIG. 1B) of the rotating shaft 19, and the preliminary intermediate raw material 14 is fastened to the rotating shaft 19 by a magnetic chuck or the like. In this state, the preliminary intermediate raw material 14 is rotated by rotating the rotating shaft 19, and the grindstone 16 is brought into contact with the outer-circumferential surface 15 of the preliminary intermediate raw material 14, then a grinding process (rough grinding) is performed on the outer-circumferential surface 15 to obtain an intermediate raw material 17. The outer-circumferential surface 15 of the preliminary intermediate raw material 14 becomes the rolling contact surface that comes in rolling contact with the pair of raceway surfaces (inner-ring raceway 6 and outer-ring raceway 7 in the case of the radial tapered-roller bearing 1 illustrated in FIG. 4) during operation of a tapered-roller bearing in which completed tapered rollers are assembled.

Figure 3:
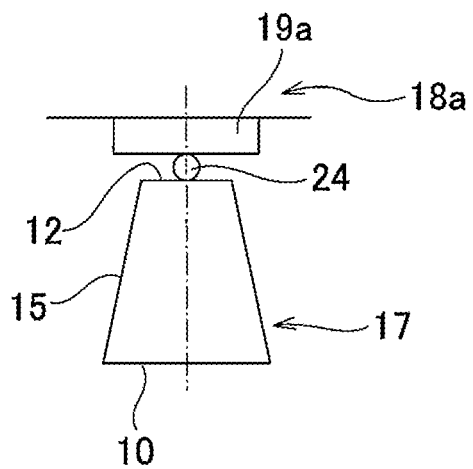
FIG. 3 illustrates another example of a method for measuring the length of an intermediate raw material.

Next, as illustrated in FIG. 1C, the initial value Lo of the length (dimension in the axial direction) of the intermediate raw material 17 is measured with the small-diameter-side end surface 12 of the intermediate raw material 17 as a reference. The small-diameter-side end surface 12 of the intermediate raw material 17 is butted against the tip-end surface of the rotating shaft 19a of the spindle device 18a, and the tip-end section of a detecting rod (measurement element) 23 of a measurement device 22 is brought into contact with the large-diameter-side end surface 10 of the intermediate raw material 17, or a measurement unit of a non-contact sensor is made to closely face the large-diameter-side end surface 10 of the intermediate raw material 17. Then, the intermediate raw material 17 is rotated by rotating the rotating shaft 19a, and the length of the intermediate raw material 17 is measured around the entire circumference by the detecting rod 23 or the measurement unit of a non-contact sensor, and the average value of the obtained values is taken to be the initial value Lo of the length of the intermediate raw material 17. As illustrated in FIG. 3, the initial value Lo of the length of the intermediate raw material 17 can also be found by bringing the small-diameter-side end surface 12 of the intermediate raw material 17 in contact with the tip-end surface of the rotating shaft 19a of the spindle device 18a by way of a steel ball 24 and measuring the length of the center axis of the intermediate raw material 17. In this case, it is possible to stably measure the initial value Lo of the length of the intermediate raw material 17 regardless of the state of the small-diameter-side end surface 12.

Figure 2:
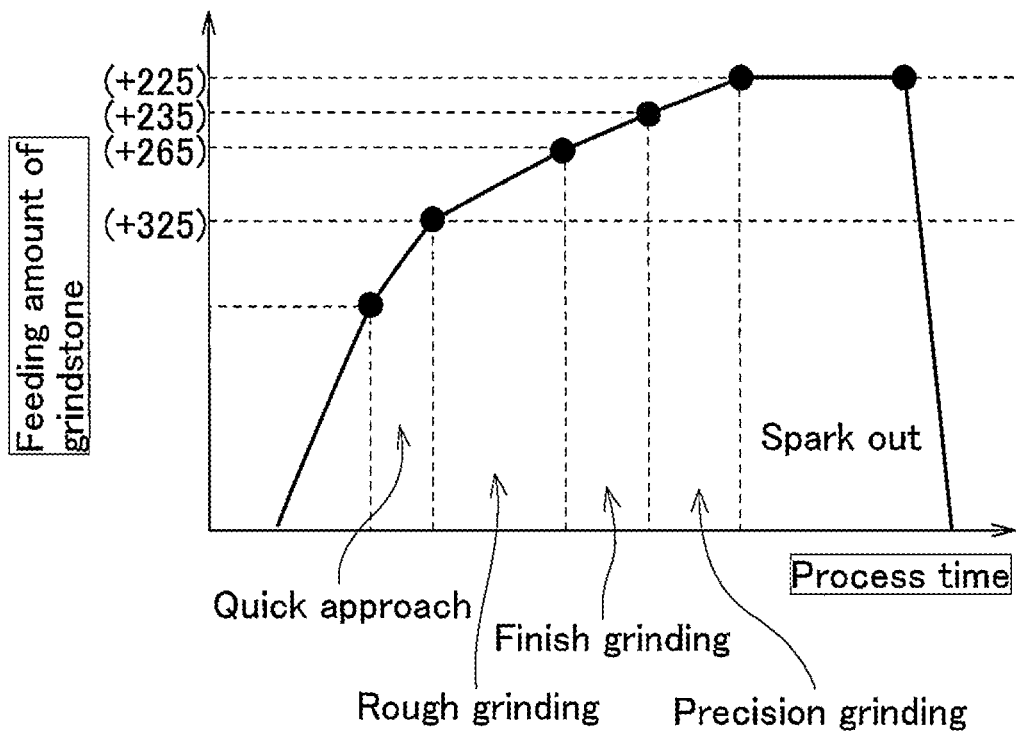
FIG. 2 is a graph illustrating an example of the relationship between processing time and the feed amount of the grindstone.

After the initial value Lo of the length of the intermediate raw material 17 has been measured, next, as illustrated in FIG. 1D, a grinding process is performed on the large-diameter-side end surface 10 of the intermediate raw material 17 using a grinding stone 20, and the large-diameter-side end section of the intermediate raw material 17 is ground only a pre-determined specified length d (dimension in the axial direction). In other words, with the center axes of the intermediate raw material 17 and the rotating shaft 19a of the spindle device 18a aligned with each other, and the small-diameter-side end surface 12 of the intermediate raw material 17 butted against the tip-end surface of the rotating shaft 19a, the intermediate raw material 17 is rotated by rotating the rotating shaft 19a. Then, the grindstone 20 is displaced upward from below, and the large-diameter-side end section of the intermediate raw material 17 is ground by bringing the tip-end surface (top-end surface in FIG. 1D) of the grindstone 20 in contact with the large-diameter-side surface 10 of the intermediate raw material 17. In this example, at the instant that the distance between the tip-end surface of the rotating shaft 19a and the tip-end surface of the grindstone 20 equals the initial value Lo of the length of the intermediate raw material 17, the vertical position (position in the axial direction of the rotating shaft 19a) of the grindstone 20 is taken to be the starting position of the grinding process. Then, the grindstone 20 is displaced upward the specified length d from this initial position, to obtain a final intermediate raw material 21a. In other words, the position of the tip-end surface (top-end surface) of the grindstone 20 (position in the vertical direction in FIG. 1D) is found from the feed amount (displacement amount) of the grindstone 20, and when the distance between the tip-end surface of the rotating shaft 19a and the tip-end surface of the grindstone becomes Lo-d, the grinding process is complete. As illustrated in FIG. 2, the process of bringing the grindstone 20 in contact with the intermediate raw material 17 is performed in the order of quick approach→rough grinding→finish grinding→precision grinding→spark out (final finish grinding), and the speed of feeding the grindstone 20 upward (=feed amount/time) is gradually decreased and finally becomes zero. The feed amount of the grindstone 20 in each step of the grinding process of the large-diameter-side end section of the intermediate raw material 17 is set in the design beforehand so that the length of the obtained final intermediate raw material 21a is within a desired range. For each intermediate raw material 17, the position of the grindstone 20 at the points of switching between each step is found from the design value and the initial value Lo of the length of the intermediate raw material 17. The grinding process is performed on the large-diameter-side end section of the intermediate raw material 17 by controlling the feeding amount and feeding speed of the grindstone 20 based on the position of the grindstone 20 that is found in this way. The tapered roller is then obtained by using a grindstone having small abrasive grain to perform a grinding process (finish processing using superfinishing) on the outer-circumferential surface 15 of the final intermediate raw material 21a that was obtained in this way. Depending on the operating conditions of the tapered-roller bearing in which the completed tapered rollers are assembled, finish processing using superfinishing can be omitted.

With the method for manufacturing tapered rollers of this example, it is possible to obtain good quality tapered rollers at low cost. In other words, in this example, after the intermediate raw material 17 is obtained by performing a grinding process on the outer circumferential surface 15 of the preliminary intermediate raw material 14 with the large-diameter-side end surface 10 of the truncated cone shaped preliminary intermediate raw material 14 as a reference, the final intermediate raw material 21a is obtained by grinding the large-diameter-side end section of the intermediate raw material 17 only a pre-determined specified amount d in the axial direction. Therefore, it is possible to minimize variation of the shape of the outer-circumferential surface 15 of the final intermediate raw material 21a (outer diameter D of the outer-circumferential surface in the case where the position P in the axial direction based on the outer-diameter-side end surface 10 of the final intermediate raw material 21a is the same). More specifically, when the variation of the length Lo in the axial direction of the preliminary intermediate raw material 14 is taken to be 500 μm, it is possible to keep the variation of the outer diameter D to be within the range of 10 μm or less. Therefore, when plural tapered rollers 4 that are obtained by performing a finishing process on the final intermediate raw material 21a that were obtained by the method for manufacturing tapered rollers of this example are assembled in a tapered-roller bearing 1, it is possible to stabilize the contact bearing pressure at the areas of rolling contact between the rolling contact surfaces of the tapered rollers 4 and the outer-ring raceway 6 and inner-ring raceway 7. Moreover, when performing a finishing process using superfinishing on the outer-circumferential surface 15 of the final intermediate raw material 21a, there is no need to regulate variation of the outer diameter D of the outer-circumferential surface 15, and processing just to prepare the outer-circumferential surface 15 is sufficient, so it is possible to stably obtain good quality tapered rollers, while reducing the amount of processing and the processing time, and suppressing the manufacturing cost of the tapered rollers.

In this example, there is a possibility of variation in the length of the final intermediate raw material 21a and further in the length of the tapered roller 4 due to variation of the length Lo of the preliminary intermediate raw material 14 caused by unavoidable manufacturing error. However, in the assembled state of the tapered-roller bearing 1, there is a gap between the small-diameter-side end surface 12 of the tapered rollers 4 and the inside surface 13 of the small-diameter-side rim section 9 of the inner ring 3, so there is no large problem even though there may be a little variation in the length of the tapered rollers 4. Moreover, the tapered rollers that are made using the method for manufacturing tapered rollers of the present invention are not limited to being assembled in a radial tapered-roller bearing, and can also be assembled in a thrust tapered-roller bearing.

Detailed Example

An example using detailed values will be given for the feed amounts of the grindstone 20 in each step of the grinding process of the large-diameter-side end section of the intermediate raw material 17 illustrated in FIG. 2.

The length Lo of the intermediate raw material 17 is taken to be the minimum value $L_{MIN}$ of the length of a completed tapered roller+325 micro meters, and the grinding amount d of the overall grinding process is taken to be 100 micro meters. With the position of the grindstone 20 when the grinding process is complete being a reference, the position of the grindstone 20 at the start of the finish grinding process is taken to be +40 micro meters, and the grinding process is switched from rough grinding to finish grinding when the position of the grindstone 20 is just 40 micro meters longer than the length of the final intermediate raw material 21a at the end of the grinding process. Moreover, the position of the grindstone 20 at the start of the precision grinding process is taken to be +10 micro meters, and the grinding process is switched from finish grinding to precision grinding when the position of the grindstone 20 is just 10 micro meters longer than the length of the final intermediate raw material 21a.

In this case, when the position of the grindstone 20 when the distance between the tip-end surface of the rotating shaft 19a and the tip-end surface of the grindstone 20 is equal to the minimum value $L_{MIN}$ is taken to be 0, the positions of the grindstone 20 at the start of the rough grinding process, finish grinding process and precision grinding process (point of switching between processes) are given below.

Position at the start of the rough grinding process: +325 micro meters

Position at the start of the finish grinding process: +265 micro meters
Position at the start of the precision grinding process: +235 micro meters
Position at the end of the precision grinding process: +225 micro meters However, when necessary, taking into consideration the amount of elastic deformation (amount of deflection) of the grindstone 20 and the support shaft that supports the grindstone 20 after the rough grinding process and the finish grinding process are complete, it is also possible to move the grindstone 20 forward (feeding amount in plus) after moving the grindstone 20 backward a small amount (feeding amount in minus).

EXPLANATION OF REFERENCE NUMBERS

1 Tapered-roller bearing
2 Outer ring
3 Inner ring
4 Tapered roller
5 Retainer
6 Outer-ring raceway
7 Inner-ring raceway
8 Large-diameter-side rim section
9 Small-diameter-side rim section
10 Large-diameter-side end surface
11 Inside surface
12 Small-diameter-side end surface
13 Inside surface
14 Intermediate raw material
15 Outer-circumferential surface
16 Grindstone
17 Intermediate raw material
18, 18*a* Spindle device
19, 19*a* Rotating shaft
20 Grindstone
21, 21*a* Final intermediate raw material
22 Measurement device
23 Detecting rod
24 Steel ball

What is claimed is:

1. A method for manufacturing tapered rollers, comprising steps of:
    obtaining an intermediate raw material by performing a grinding process on the outer-circumferential surface of a truncated cone shaped raw material having an outer diameter gradually becoming larger going in the direction from the small-diameter-side end section to the large-diameter-side end section, with the large-diameter-side end surface of the truncated cone shaped raw material being a reference; and
    grinding the large-diameter-side end section of the intermediate raw material just a specified length in the axial direction.

2. The method for manufacturing tapered rollers according to claim 1, further comprising
    a step of measuring the length of the intermediate raw material before grinding the large-diameter-side end section of the intermediate raw material, with the small-diameter-side end surface of the intermediate raw material as a reference; and wherein
    grinding of the large-diameter-side end section of the intermediate raw material is complete at the instant when, during grinding of the large-diameter-side end section of the intermediate raw material, the length of the intermediate raw material is equal to the difference between the measured value and the specified length.

3. The method for manufacturing tapered rollers according to claim 2, wherein the small-diameter-side end surface of the intermediate raw material is butted against the tip-end surface of a rotating shaft, a measurement element of a measurement device is brought into contact with or made to closely face the large-diameter-side end surface of the intermediate raw material, and the intermediate raw material is rotated by rotating the rotating shaft; and in this state, the length of the intermediate raw material is measured by the measurement element of the measurement device.

4. A tapered-roller bearing comprising:
    an outer ring having a partial cone shaped outer-ring raceway formed around the inner-circumferential surface thereof;
    an inner ring having a partial cone shaped inner-ring raceway formed around the middle section of the outer-circumferential surface thereof, a large-diameter-side rim section formed on the larger-diameter-side end section thereof, and a small-diameter-side rim section formed on the small-diameter-side end section thereof; and
    plural tapered rollers that are rotatably provided between the outer-ring raceway and the inner-ring raceway; wherein
    the tapered rollers that are obtained by the method for manufacturing tapered rollers according to claim 1 are used as the tapered rollers.

\* \* \* \* \*